United States Patent [19]

Whalen

[11] Patent Number: 4,726,246
[45] Date of Patent: Feb. 23, 1988

[54] COUNTERSHAFT TRANSMISSION HAVING TWO FORWARD AND TWO REVERSE SPEEDS

[75] Inventor: Charles E. Whalen, Metamora, Ill.

[73] Assignee: Caterpillar Inc., Peoria, Ill.

[21] Appl. No.: 914,100

[22] Filed: Oct. 1, 1986

[51] Int. Cl.[4] ............................................. F16H 3/08
[52] U.S. Cl. ...................................... 74/360; 74/333; 74/357
[58] Field of Search ................. 74/333, 357, 358, 359, 74/360, 366, 369, 374, 375

[56] References Cited

U.S. PATENT DOCUMENTS

| | | | |
|---|---|---|---|
| 2,869,382 | 1/1959 | Klecker et al. | 74/360 |
| 3,254,541 | 6/1966 | Schou | 74/360 |
| 3,425,293 | 2/1969 | Krawczyk et al. | 74/360 |
| 3,465,609 | 9/1969 | Fisher et al. | 74/360 |
| 3,858,455 | 1/1975 | Sisson et al. | 74/360 |
| 3,893,345 | 7/1975 | Sisson et al. | 74/360 X |
| 4,145,935 | 3/1979 | Herlitzek | 74/360 X |
| 4,341,127 | 7/1982 | Stodt | 74/333 |
| 4,392,391 | 7/1983 | Jameson et al. | 74/333 |
| 4,570,503 | 2/1986 | Theobald | 74/360 |
| 4,584,891 | 4/1986 | Mori | 74/359 X |
| 4,589,295 | 5/1986 | Jerry et al. | 74/360 |
| 4,627,302 | 12/1986 | Laylock et al. | 74/360 |

FOREIGN PATENT DOCUMENTS

| | | |
|---|---|---|
| 1119678 | 12/1961 | Fed. Rep. of Germany . |
| 2029572 | 12/1971 | Fed. Rep. of Germany . |
| 2535700 | 2/1977 | Fed. Rep. of Germany ........ 74/360 |
| 2228984 | 12/1974 | France . |
| 85/05665 | 12/1985 | PCT Int'l Appl. . |
| 1587699 | 4/1981 | United Kingdom . |

OTHER PUBLICATIONS

Exhibit A—Borg Warner Corporation T22, Power Shift Transmission Circa, 1960.
Exhibit B—Borg Warner Corporation PR2, Power Shift Transmission Circa, 1980.
Exhibit C—Funk Manufacturing Co., 2 Speed 18 ⅝" Drop Power Shift Transmission, FIG. 6 from SAE Publication 720387, presented Apr. 10–12, 1972.
Exhibit D—Clark Equipment Co., 2 Speed Power Shift Transmission—FIG. 2 from SAE Publication 740673, presented Sep. 9–12, 1974.

Primary Examiner—Leslie Braun
Assistant Examiner—Dwight G. Diehl
Attorney, Agent, or Firm—Charles E. Lanchantin, Jr.

[57] ABSTRACT

Countershaft transmissions are useful for vehicles such as lift trucks or the like. But obtaining the desired speed reduction ratios and alignment of the various axes where space is at a premium is difficult. The subject countershaft transmission provides two forward speeds and two reverse speeds using four compactly grouped rotating clutch assemblies of the interleaved multiple plate and disc type for selectively connecting a plurality of constantly meshing gears in preselected patterns. A reverse clutch assembly is mounted on a first shaft, a forward clutch assembly and a low speed clutch assembly are mounted on a second shaft, and a high speed clutch assembly is mounted on a third shaft. A fourth shaft having a bevel pinion gear thereon is located at a minimal drop height "D" from the first shaft so that the longitudinal axis of the bevel pinion gear can intersect the transverse axis of a bevel ring gear associated therewith. The elements of the disclosed transmission are particularly compact and permit the associated output components on the transverse axis to be located tightly against those longitudinally arranged.

16 Claims, 2 Drawing Figures

COUNTERSHAFT TRANSMISSION HAVING TWO FORWARD AND TWO REVERSE SPEEDS

DESCRIPTION

1. Technical Field

This invention relates generally to a countershaft transmission for a shuttle-type vehicle or the like, and more particularly to a compact power shift countershaft transmission using constant mesh gearing and a plurality of rotating clutches of the interleaved plate and disc type.

2. Background Art

Countershaft transmissions having at least two forward and two reverse speeds are particularly useful in the drive line of vehicles such as lift trucks, wheel loaders, and other heavy duty transport and earthmoving machines. Such transmissions are advantageous in that a plurality of rotating clutches and associated continually meshing gears can be so positioned on the usual parallel shafts as to allow considerable structural compactness and an adaptability to the elevational drop requirement between the input axis and the output axis.

On vehicles such as lift trucks it is often desired to align the engine output axis and the transmission input shaft axis and to locate these axes at a relatively low elevational position. The transmission output shaft axis is preferably located only slightly below the input shaft axis, and a bevel gear set is normally required to transmit torque from the longitudinally oriented output shaft to the transversely oriented drive axis of the lift truck and to provide additional speed reduction. Unfortunately, prior art countershaft transmissions are unable to provide the desired overall speed reduction ratios with a relatively small elevational drop without requiring excessive space or without adopting a hypoid form of bevel gear set. Hypoid gears are undesirable because they require special oils and because they increase manufacturing costs.

Accordingly, what is required is a structurally simple and compact power shift countershaft transmission providing two forward and two reverse speeds using a minimum number of shafts and constantly meshing gears. Preferably, such a transmission should also provide a minimal drop height between the input and output shaft axes, a relatively economical spiral bevel gear set at the output for quieter and smoother operation, and overall speed reduction ratios in the order of about 7.48:1 and 4.23:1 so as to eliminate the usual reduction ratio required in the opposite final drives of the vehicle. And furthermore, the longitudinally oriented elements of the transmission should preferably be so constructed and arranged as to enable the bevel ring gear and associated transversely oriented cross drive elements to be positioned compactly against them so as to minimize the overall longitudinal length thereof.

DISCLOSURE OF THE INVENTION

The present invention is directed to overcoming one or more of the above problems.

In one aspect of the present invention there is provided a countershaft transmission including an input first shaft, an intermediate shaft second and a third shaft, a plurality of constantly meshing gears mounted on the shafts, and clutch means for selectively connecting the gears in preselected patterns to provide two forward and two reverse speeds. Particularly, the countershaft transmission includes a first gear on the input first shaft and rotatable therewith, and another gear connected to rotate freely on the second shaft and intermeshingly engaged with the first gear, and features first and second directional clutch assemblies and first and second speed clutch assemblies of the interleaved plate and disc type arranged such that one of the directional clutch assemblies is located on the first shaft, the other one of the directional clutch assemblies and one of the speed clutch assemblies is located on the second shaft, and the other one of the speed clutch assemblies is located on the third shaft.

In accordance with another aspect of the present invention there is provided an input first shaft, a first gear rotatable with the first shaft, a second gear freely rotatable on the first shaft, first directional clutch means for connecting the second gear to the first shaft, a second shaft, a third gear rotatable with the second shaft, fourth and fifth gears freely rotatable on the second shaft, second directional clutch means for connecting the fourth gear to the second shaft, first speed clutch means for connecting the fifth gear to the second shaft, a third shaft, sixth and seventh gears rotatable with the third shaft, an eighth gear freely rotatable on the third shaft, second speed clutch means for connecting the eighth gear to the third shaft, and with the first and fourth gears being intermeshed, the second and eighth gears being intermeshed, and the fifth and sixth gears being intermeshed.

In addition to providing the desired speed reduction ratios in the two forward and two reverse speeds, the minimal drop height "D", and generally overall compactness, the power shift transmission of the present invention includes a spiral bevel pinion gear connected to the output shaft and intermeshed with a spiral bevel ring gear. Thus, the more complex form of hypoid bevel gear set is avoided.

BEST MODE FOR CARRYING OUT THE INVENTION

Figure 1:
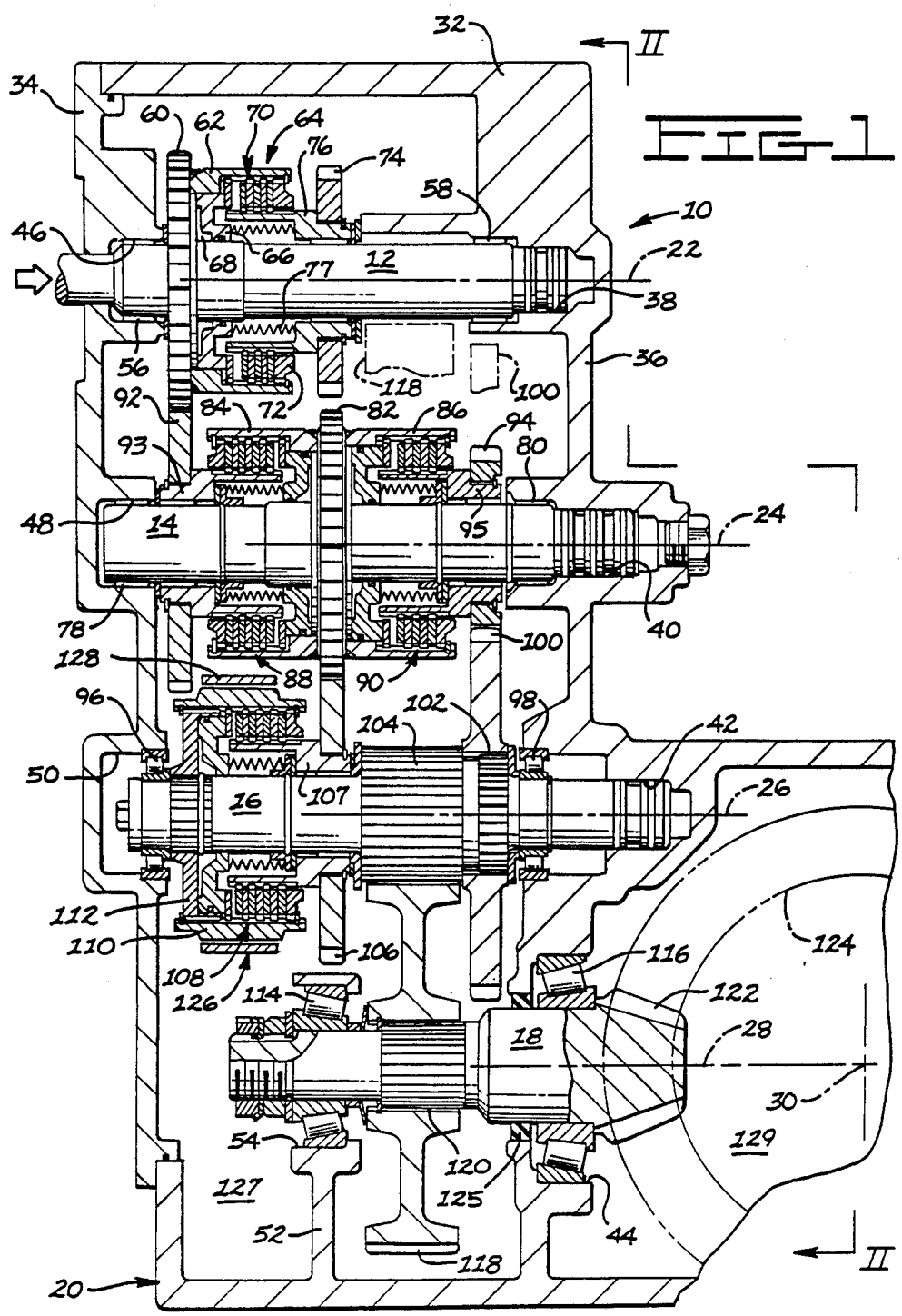
FIG. 1 is a diagrammatic and developed sectionalized view of a two speed forward and two speed reverse countershaft transmission constructed in accordance with the present invention.
Figure 2:
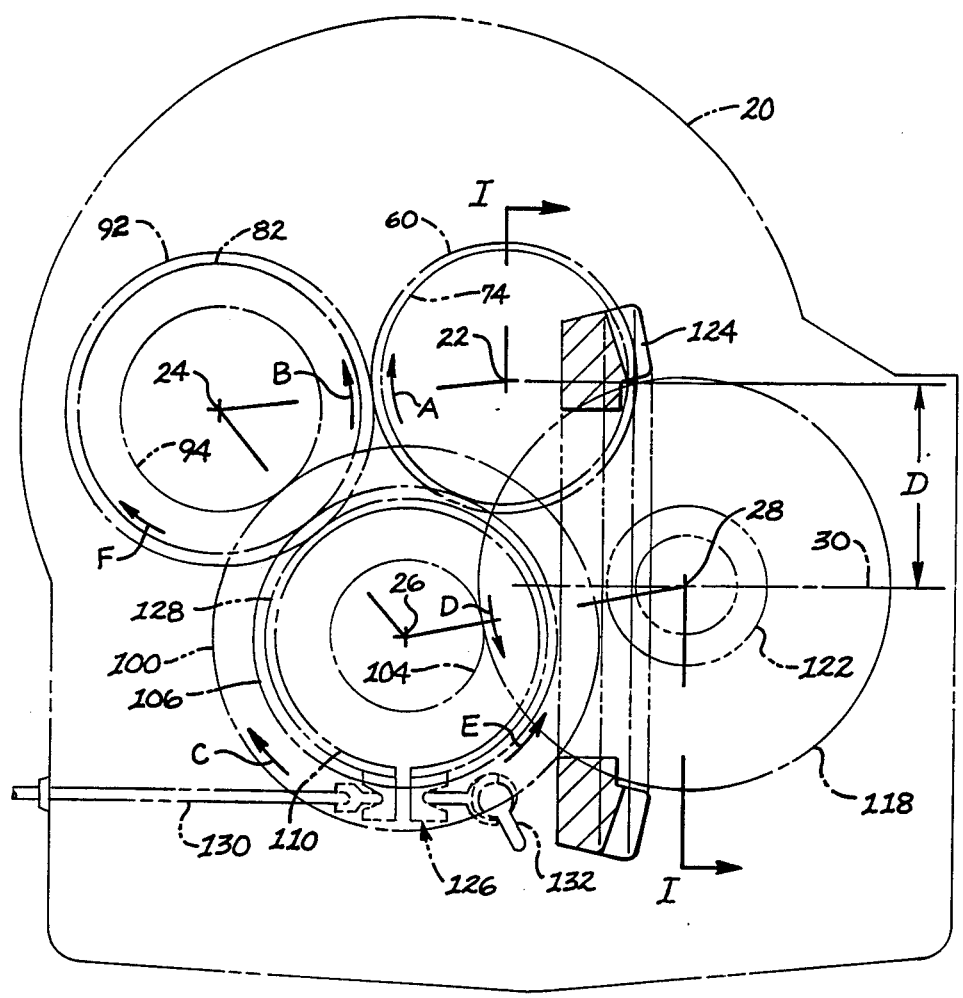
FIG. 2 is a diagrammatic, front end elevational view of the countershaft transmission of FIG. 1 taken along line II—II thereof with the various elements illustrated in phantom lines for convenience and showing the true relationships of the various shaft axes, the constantly meshing gears associated therewith, the cutting plane of development of FIG. 1, and the spiral bevel ring gear in full section lines.

Referring to the developed sectional view of FIG. 1, there is shown a countershaft transmission 10 for a lift truck or the like having an input shaft or first shaft 12, a second shaft or first intermediate shaft 14, a third shaft or second intermediate shaft 16, and an output shaft or fourth shaft 18 rotatably supported in a housing 20. The shafts 12, 14, 16 and 18 are rotatably mounted in the housing respectively along parallel axes 22, 24, 26 and 28, and have a front end view relationship as is shown in FIG. 2. The input shaft is the uppermost shaft, the third shaft is the lowermost shaft and is located substantially under the input shaft, and the second and fourth shafts are disposed at the opposite sides thereof and elevationally therebetween. Alternatively stated, in an end view of the shafts are arranged in a generally diamond-shaped pattern with the input and third shafts being oppositely disposed and the second and fourth shafts being oppositely disposed. FIG. 2 also illustrates that the transversely oriented drive axis 30 of the lift truck is beneficially disposed in an intersecting right angle relationship to the output shaft axis 28.

The housing 20 is generally constructed of a front main case portion 32 and a rear cover portion 34 which are respectively located at the right and left when viewing FIG. 1. A front wall 36 of the main case portion integrally defines blind cylindrically shaped stepped pockets 38, 40 and 42 on the axes 22, 24 and 26 respectively, and a stepped cylindrical bore 44 on the axis 28. The cover portion similarly integrally defines a stepped cylindrical bore 46 on the input axis 22, a blind cylindrical bore 48 on the axis 24, and a blind cylindrical shaped stepped pocket 50 on the axis 26. And lastly, an intermediate support wall 52 of the main case portion defines a stepped bore 54 along the axis 28.

The rear portion of the input shaft 12 is supported by a needle or roller bearing assembly 56 mounted in the stepped bore 46, and the front portion is supported by a needle or roller bearing assembly 58 mounted in the stepped pocket 38. A first gear 60 is integrally connected to the input shaft adjacent the rear bearing 56, and an internally splined drum 62 is integrally connected, as by welding, to the first gear. The drum forms the driven member of a reverse clutch assembly 64 of the usual interleaved multiple plate and disc type. In the instant example the reverse clutch assembly includes an annular actuating piston 66 which is selectively and controllably moved to the right when viewing FIG. 1 under fluid pressure delivered to an actuating chamber 68 in a well known manner. This clamps a plurality of annular plates alternately interleaved with a plurality of annular friction discs, and identified generally by the reference number 70, against an end reaction plate 72. This connects a second gear 74 and an associated hub assembly 76, otherwise both freely rotatably mounted on the input shaft 12, for conjoint rotation with the input shaft. It is to be understood that the plates and discs are alternately connected to the drum 62 and to the hub assembly 76 through conventional spline joints, and the actuating piston is preferably mechanically retracted by one or more compression springs 77 in the absence of sufficient control pressure to the chamber 68.

The rear end of the second shaft 14 is rotatably supported by a needle or roller bearing assembly 78 in the blind bore 48, while the front end is supported by a needle or roller bearing assembly 80 in the pocket 40. A third gear 82 is connected to rotate with the second shaft, and an internally splined rear drum 84 and an internally splined front drum 86 are integrally connected to the third gear. The drums 84 and 86 respectively form a portion of a forward clutch assembly 88 and a low speed clutch assembly 90 compactly arranged in back-to-back relation. These clutch assemblies have the same general multiple plate and disc form of construction as the reverse clutch assembly 64 and so need not be described further. However, when engaged or actuated, the forward clutch assembly is effective to couple a fourth gear 92 and associated hub assembly 93 to the second shaft 14 for conjoint rotation, and the low speed clutch assembly is effective to couple a fifth gear 94 and associated hub assembly 95 to the second shaft for conjoint rotation. When these clutch assemblies are disengaged the fourth and fifth gears are free to rotate on the second shaft. The fourth gear 92 is disposed in intermeshing relationship with the first gear 60 on the input shaft 12.

Turning now to the third shaft 16, it is rotatably supported by a roller bearing assembly 96 in the pocket 50 at the rear end thereof and is rotatably supported by another roller bearing assembly 98 in the front end pocket 42. A relatively large diameter sixth gear 100 is coupled to the third shaft by a spline joint 102, and a seventh gear 104 is preferably formed as an integral part of the third shaft. An eighth gear 106 and an associated hub assembly 107 are mounted for free rotation on the third shaft, but is selectively connectable thereto by a high speed clutch assembly 108. In this instance the high speed clutch assembly includes an internally splined drum 110 which is coupled for conjoint rotation with the third shaft by an intermediate hub 112. Otherwise, the high speed clutch assembly is like the other clutch assemblies. The sixth gear 100 continually intermeshes with the fifth gear 94, while the eighth gear 106 continually intermeshes with both the second gear 74 and the third gear 82.

The output fourth shaft 18 is rotatably supported within the housing 20 by a pair of opposed tapered roller bearing assemblies 114 and 116 seated respectively within the rear and front stepped bores 54 and 44. A relatively large diameter ninth gear 118 is connected to rotate with the fourth shaft by a spline joint 120, and it is intermeshed with the seventh gear 104 and normally driven thereby. A tenth gear or spiral bevel pinion gear 122 is integrally formed on the front end of the output fourth shaft, and is adapted to intermeshingly engage an eleventh gear or spiral bevel ring gear 124. The bevel ring gear 124, also shown in FIG. 2, is supported in the housing 20 for rotation about the transverse drive axis 30 by any conventional bearing arrangement, although not illustrated. A seal ring 125 supported in the housing wall 36 is effective to divide the housing into a transmission compartment 127 and a differential compartment 129 so that different lubricating fluids can be used in each one.

The countershaft transmission 10 also incorporates an internal parking brake mechanism 126 generally arranged in a concentric manner with respect to the third shaft axis 26. The diagrammatically illustrated brake mechanism is of conventional construction and includes a C-shaped brake band 128 that substantially surrounds the clutch drum 110 of the high speed clutch assembly 108 and is mounted between an adjustable anchor 130 at one end and an actuating portion 132 at the other. Movement of the actuating portion toward the anchor will serve to clamp the brake band against the drum and retard movement of the third shaft 16, the interconnected gears 104 and 118, and thus the output shaft 18 and the gears 122 and 124.

Industrial Applicability

In operation, the input shaft 12 of the countershaft transmission 10 is driven by an engine and hydrodynamic torque converter of the usual type, not shown. This drives the first gear 60 and the associated rear drum 62 in a clockwise direction when viewing along the input axis 22 from the front of the transmission as is shown by the arrow A in FIG. 2. Assuming that the vehicle operator desires a first forward speed condition, fluid is controllably communicated to the forward clutch assembly 88 and to the low speed clutch assembly 90 to engage them. This couples both the fourth gear 92 and the fifth gear 94 to the second shaft 14 for conjoint rotation. Accordingly, the output shaft 18 is driven at a relatively low speed ratio by way of gear pairs 60-92, 94-100 and 104-118. The fourth gear 92 and the fifth gear 94 are caused to rotate in a counterclockwise direction as indicated by the arrow B in FIG. 2, the sixth gear 100 is caused to rotate in a clockwise direction as indicated by the arrow C, and the ninth gear 118 is caused to rotate in a counterclockwise direction as indicated by the arrow D or in an opposite directional sense to that of the input shaft.

In order to upshift from first forward speed to second forward speed it is only necessary to disengage the low speed clutch assembly 90 and to engage the high speed clutch assembly 108. In this mode the speed reduction ratio is reduced and the output shaft 18 is driven at a higher speed by way of gear pairs 60-92, 82-106 and 104-118.

In the first reverse speed condition the reverse clutch assembly 64 and the low speed clutch assembly 90 are engaged. Torque is thereby transmitted to the output shaft 18 by way of the three gear chain 74-106-82, and the gear pairs 94-100 and 104-118. The clockwise rotation of the second gear 74 causes the freewheeling eighth gear 106 to go in a counterclockwise direction as indicated by the arrow E in FIG. 2. This causes the third gear 82 to rotate in a clockwise direction along with the fifth gear 94 as indicated by the arrow F, the sixth and seventh gears 100 and 104 to rotate in a counterclockwise direction as indicated by the arrow E, and the ninth gear 118 to rotate in a clockwise direction or in the same directional sense as that of the input shaft 12.

A shift to second speed reverse will cause the low speed clutch assembly 90 to disengage and the high speed clutch assembly 108 to engage. Torque is thereby transmitted more directly from the input shaft 12 to the output shaft 18 through coupled gear pairs 74-106 and 104-118.

The number of gear teeth and corresponding speed reduction ratios between the input shaft 12 and the output shaft 18 which are obtained with one embodiment of the countershaft transmission 10 are shown by the charts immediately below:

| Number of Gear Teeth | | |
|---|---|---|
| first gear | 60 | 50 teeth |
| second gear | 74 | 45 teeth |
| third gear | 82 | 52 teeth |
| fourth gear | 92 | 58 teeth |
| fifth gear | 94 | 37 teeth |
| sixth gear | 100 | 73 teeth |
| seventh gear | 104 | 30 teeth |
| eighth gear | 106 | 58 teeth |
| ninth gear | 118 | 98 teeth |
| tenth gear | 122 | 11 teeth |
| eleventh gear | 124 | 41 teeth |

| Gear Reduction Ratio | | |
|---|---|---|
| | Forward | Reverse |
| low | 7.48 | 7.45 |
| high | 4.23 | 4.21 |

One feature of the countershaft transmission is that the reverse, forward and high speed clutch assemblies 64, 88 and 108 have the same general longitudinal location so that they are aligned with each other in a compact radially nested manner. Moreover, as is shown in FIG. 1 to the front or right side of the second gear 74, the partial phantom outlines of the sixth gear 100 and the ninth gear 118 immediately below the input shaft 12 indicate more realistically just how little clearance is provided thereat, since the developed view is a distortion of the actual conditions of the radially nested elements. By locating one of the directional clutch assemblies 64 and 88 on the input shaft 12, the remaining one of the directional clutch assemblies and one of the speed clutch assemblies 90 and 108 on the second shaft 14 in preferably back-to-back relation, and the other one of the speed clutch assemblies on the third shaft the various elements including the relatively large ninth gear 118 can be compactly positioned radially so as to enable the alignment of the longitudinal axis 28 of the spiral bevel pinion gear 122 with the transverse axis 30 of the spiral bevel ring gear 124, while simultaneously providing the desired relatively small drop of only about 122 mm (4.8"). This drop height is indicated by the letter "D" in FIG. 2, and is the actual elevational distance between the input and output axes 22 and 28. Because of the alignment of the axes 28 and 30, spiral bevel teeth can be used and it is unnecessary to use the more complex hypoid bevel gear tooth form and mounting thereof.

It is to be appreciated that the designation of clutch assembly 64 as the reverse clutch and clutch assembly 88 as the forward clutch can be considered arbitrary, as it is well known in the art that the actual direction on the vehicle can be easily reversed. For example, the bevel ring gear 124 could merely be positioned on the opposite side of the bevel pinion gear 122 to reverse the travel direction of the vehicle with the same clutch assemblies engaged. It is a significant that one of the directional cutch assemblies provides a forward mode of operation while the remaining one provides a reverse mode at the output shaft 18.

In view of the foregoing, it is apparent that the countershaft transmission 10 is particularly useful for shuttle type operations in a lift truck vehicle or the like where a short drop height is required and space is at a premium. It has a relatively short length in the longitudinal direction of the parallel shafts and allows the output components on the transverse axis 30 to be located tightly against those longitudinally arranged, even though a portion of such length is due to the construction of the stepped bores and pockets which advantageously provide a plurality of pressurized fluid operating passages and lubrication passages thereat. And furthermore, the two-piece housing 20 allows convenient assembly and disassembly of the transmission. It also provides the desired relatively substantial speed reduction ratios using but four clutch assemblies, four shafts and nine gears to the output shaft 18.

Other aspects, objects and advantages of this invention can be obtained from a study of the drawings, the disclosure, and the appended claims.

I claim:

1. In a countershaft transmission of the type including an input first shaft, an intermediate second shaft and a third shaft, a plurality of constantly meshing gears mounted on the shafts, and clutch means for selectively connecting the gears in preselected patterns and providing two forward and two reverse speeds, the improvement comprising:

the plurality of gears including a first gear on the input first shaft and rotatable therewith, and another gear connected to rotate freely on the intermediate second shaft and intermeshingly engaged directly with the first gear;

the clutch means including first and second directional clutch assemblies and first and second speed clutch assemblies with each of the clutch assemblies being of an annular interleaved plate and disc construction; and one of the directional clutch assemblies being located on the input first shaft, the other one of the directional clutch assemblies and one of the speed clutch assemblies being located on the second shaft, and the other one of the speed clutch assemblies being located on the third shaft.

2. The contershaft transmission of claim 1 wherein the input first shaft and the third shaft are respectively at the highest and lowest elevations.

3. The countershaft transmission of claim 1 including an output fourth shaft located elevationally below the first and second shafts and elevationally above the third shaft.

4. The countershaft transmission of claim 1 wherein the third shaft is located generally elevationally beneath the input first shaft.

5. The countershaft transmission of claim 1 wherein the speed clutch assembly on the second shaft is a low speed clutch assembly.

6. The countershaft transmission of claim 5 wherein the directional clutch assembly on the input first shaft is a reverse speed clutch assembly.

7. The countershaft transmission of claim 1 wherein the plurality of gears includes a second gear connected to rotate freely on the input first shaft, a third gear connected to rotate with the second shaft, the another gear can be referred to as a fourth gear, the directional clutch on the input first shaft is effective to connect the second gear for joint rotation with the input first shaft, and the other directional clutch on the second shaft is effective to connect the fourth gear for joint rotation with the second shaft.

8. The countershaft transmission of claim 7 wherein the plurality of gears includes a fifth gear connected to rotate freely on the second shaft, a sixth gear and a seventh gear connected to rotate with the third shaft, and an eighth gear connected to rotate freely on the third shaft, the sixth gear being intermeshed with the fifth gear and the eight gear being intermeshed with the second gear and the third gear.

9. The countershaft transmission of claim 8 including an output fourth shaft, and wherein the plurality of gears includes a ninth gear connected to rotate with the output shaft, the ninth gear being intermeshed with the seventh gear.

10. The contershaft transmission of claim 9 wherein both the sixth gear and the ninth gear have relatively minimal radial clearance with respect to the first shaft for radial compactness.

11. The countershaft transmission of claim 1 wherein the directional clutch assemblies and one of the speed clutch assemblies have the same general longitudinal location so that they are aligned with each other in a radially nested manner.

12. The countershaft transmission of claim 1 wherein the other one of the speed clutch assemblies on the third shaft includes an internally splined drum and brake means for retarding rotation of the drum.

13. In a counter shaft transmission of the type including an input first shaft, intermediate second and third shafts, an output fourth shaft, and housing means for rotatably supporting the shafts in parallel relation, the improvement comprising:

a plurality of gears mounted on the shafts including a first gear on the input first shaft and rotatable therewith, a second gear connected to rotate freely on the input first shaft, a third gear on the second shaft and rotatable therewith, and a fourth gear connected to rotate freely on the second shaft and intermeshingly engaged directly with the first gear; and clutch means for selectively connecting the gears in preselected patterns and providing two forward and two reverse speed, the clutch means including a reverse speed clutch assembly on the input first shaft, a forward speed clutch assembly and a low speed clutch assembly on the second shaft, and a high speed clutch assembly on the third shaft.

14. A countershaft transmission comprising:

a first shaft;

a first gear connected to rotate with the first shaft;

a second gear connected to rotate freely on the first shaft;

first directional clutch means for selectively connecting the second gear to the first shaft;

a second shaft;

a third gear connected to rotate with the second shaft;

fourth and fifth gears connected to rotate freely on the second shaft;

second directional clutch means for selectively connecting the fourth gear to the second shaft;

first speed clutch means for selectively connecting the fifth gear to the second shaft;

a third shaft;

a sixth gear connected to rotate with the third shaft;

another gear connected to rotate freely on the third shaft; and second speed clutch means for selectively connecting the another gear to the third shaft, the first and fourth gears being intermeshed, the another gear being intermeshed with the second gear and the third gear, and the fifth and sixth gears being intermeshed.

15. The countershaft transmission of claim 14 including a fourth shaft, gear means for connecting the third and fourth shafts, and a bevel pinion gear connected to rotate with the fourth shaft.

16. The countershaft transmission of claim 14 including a bevel ring gear driven by the bevel pinion gear, the bevel ring and pinion gears having intersecting axes.

* * * * *